United States Patent [19]

Staerzl

[11] E Patent Number: Re. 32,667

[45] Reissued Date of Patent: May 17, 1988

[54] GATED KNOCK DETECTOR FOR INTERNAL-COMBUSTION ENGINES

[75] Inventor: Richard E. Staerzl, Fond du Lac, Wis.

[73] Assignee: Brunswick Corporation, Skokie, Ill.

[21] Appl. No.: 94,721

[22] Filed: Sep. 9, 1987

Related U.S. Patent Documents

Reissue of:

[64] Patent No.: 4,667,637
Issued: May 26, 1987
Appl. No.: 817,131
Filed: Jan. 8, 1986

[51] Int. Cl.[4] ..... F02P 5/155; G01L 23/22

[52] U.S. Cl. ..... 123/435; 123/425; 73/35

[58] Field of Search ..... 123/425, 435; 73/35

[56] References Cited

U.S. PATENT DOCUMENTS

| | | | |
|---|---|---|---|
| 4,243,009 | 1/1981 | Staerzl | 123/435 |
| 4,440,129 | 4/1984 | Iwata | 73/35 X |
| 4,449,501 | 5/1984 | Greeves | 123/435 X |
| 4,535,739 | 8/1985 | Kuoo et al. | 123/435 X |
| 4,552,111 | 11/1985 | Tahara | 123/435 X |
| 4,565,087 | 1/1986 | Damson et al. | 73/35 |
| 4,593,553 | 6/1986 | Bonitz et al. | 73/35 |

*Primary Examiner*—Willis R. Wolfe

*Attorney, Agent, or Firm*—Hopgood, Calimafde, Kalil, Blaustein & Judlowe

[57] ABSTRACT

A system for use with an internal combustion engine which reduces, or eliminates, engine knock and attendant engine damage. An audio transducer is placed on an engine cylinder to convert audio signals occurring within the combustion chamber into an electrical signal. This signal is sampled and filtered and the amplitudes of two time-sequenced segments are compared. One of those segments is timed for an interval during which detonation, if any, is likely to occur, and the other of these segments is timed for an interval during which no detonation is likely to occur. When the amplitude of the sample from the segment of likely detonation exceeds the amplitude of the sample from the segment of unlikely detonation, by a predetermined amount, extra fuel is momentarily added to the combustion chamber to slow down the rate of combustion and cool the walls of the combustion chamber.

17 Claims, 2 Drawing Sheets

GATED KNOCK DETECTOR FOR INTERNAL-COMBUSTION ENGINES

Matter enclosed in heavy brackets [ ] appears in the original patent but forms no part of this reissue specification; matter printed in italics indicates the additions made by reissue.

FIELD OF THE INVENTION

This invention relates to a knock-prevention system for an internal-combustion engine with timed ignition and more particularly to an electronic circuit which will detect the occurrence of engine knocking and initiate corrective steps to reduce the knock and prevent engine damage.

BACKGROUND OF THE INVENTION

Engine "knock" or "detonations" in an internal-combustion engine are caused by uncontrolled and rapid combustion in the combustion chamber leading to the undesirable generation of heat and pressure; this is attributable to variations in the octane of available fuel, and the prospect is for greater knocking as octane ratings reduce. Knock, when severe, causes a loss of engine efficiency and can cause severe engine damage, such as pitting, cracking or even destruction of the pistons or of the walls surrounding the combustion chamber. This problem is particularly severe with two-cycle engines and when such engines are used in a marine environment, the consequences of engine damage can be catastrophic.

It is, therefore, an object of the instant invention to prevent unnecessary engine damage by reducing, or eliminating, engine knock.

It is a specific object of the instant invention to reduce or eliminate knock with an inexpensive and uncomplicated electronic circuit readily adaptable for use with two-cycle engines.

Various knock-control circuits are known for use with internal-combustion engines, which circuits attempt to control knock merely by adjustment of the spark timing. However, known spark-control circuits cause exhaust-gas temperatures to rise, resulting in development of additional heat in the combustion chamber. Such added heat is undesirable, as it can result in additional or more severe engine damage.

It is, therefore, a still further object of the instant invention to reduce, or eliminate, knock in an internal combustion engine, by means which will reduce heat development in the combustion chamber.

SUMMARY OF THE INVENTION

In accordance with a first aspect of the invention, audio signals indicative of engine combustion and occurring within a combustion chamber in an internal combustion engine are detected and converted into an electrical detonation signal. Usually, one cylinder is more prone to knocking detonation than other cylinders of the engine, and therefore the cylinder most prone to such knocking is selected for this audio-signal detection.

It is a feature of the invention that the detected electrical detonation signal is sequentially filtered and sampled, and that the voltage amplitude of first and second samples are compared at a voltage-comparator circuit.

It is a further feature of the invention that the first sample is taken from the detected electrical signal during a first time interval which is earlier in the time than a second time interval which is predetermined to include the electrical detonation signal. The second sample is taken from the detected electrical signal during the second time interval, and knock prevention is initiated when the second sample is greater in amplitude than the first sample by a predetermined amount.

It is a still further feature of the invention that engine knock is prevented, or combustion-chamber heat development is reduced, in response to the initiation of knock prevention, by momentarily increasing the fuel supply to the combustion chamber, which increase in fuel supply serves to slow down the combustion process and cool the walls of the combustion chamber.

Still another feature is the provision of a fail-safe feature in the knock-suppressing circuitry.

These and other objects and features of the invention will be more readily understood by reference to the following detailed description and accompanying drawings.

DETAILED DESCRIPTION

Figure 1:
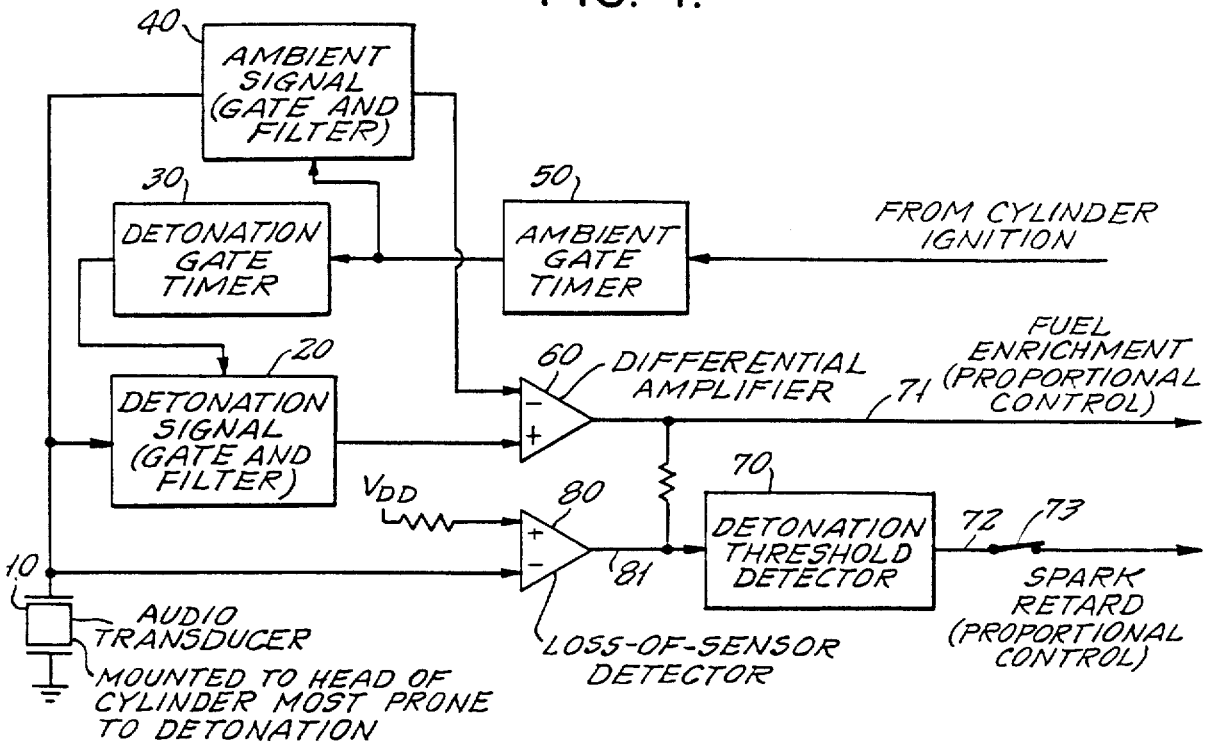
FIG. 1 is an electrical block diagram schematically depicting a gated knock-detection circuit of the instant invention.

Referring now to FIG. 1, a knock-detection system of the invention is seen to include an audio transducer 10, a pair of gating and filter circuits 20, 40, a pair of timing circuits 30, 50, a differential amplifier 60 and a detonation-threshold detector 70. As suggested by legend, the cylinder head to which transducer 10 is mounted is selected for the cylinder most prone to detonation knocking in an involved engine, which may illustratively be a multiple-cylinder, two-cycle, fuel-injected engine of the type shown in my U.S. Pat. No. 4,349,000.

Figure 2:
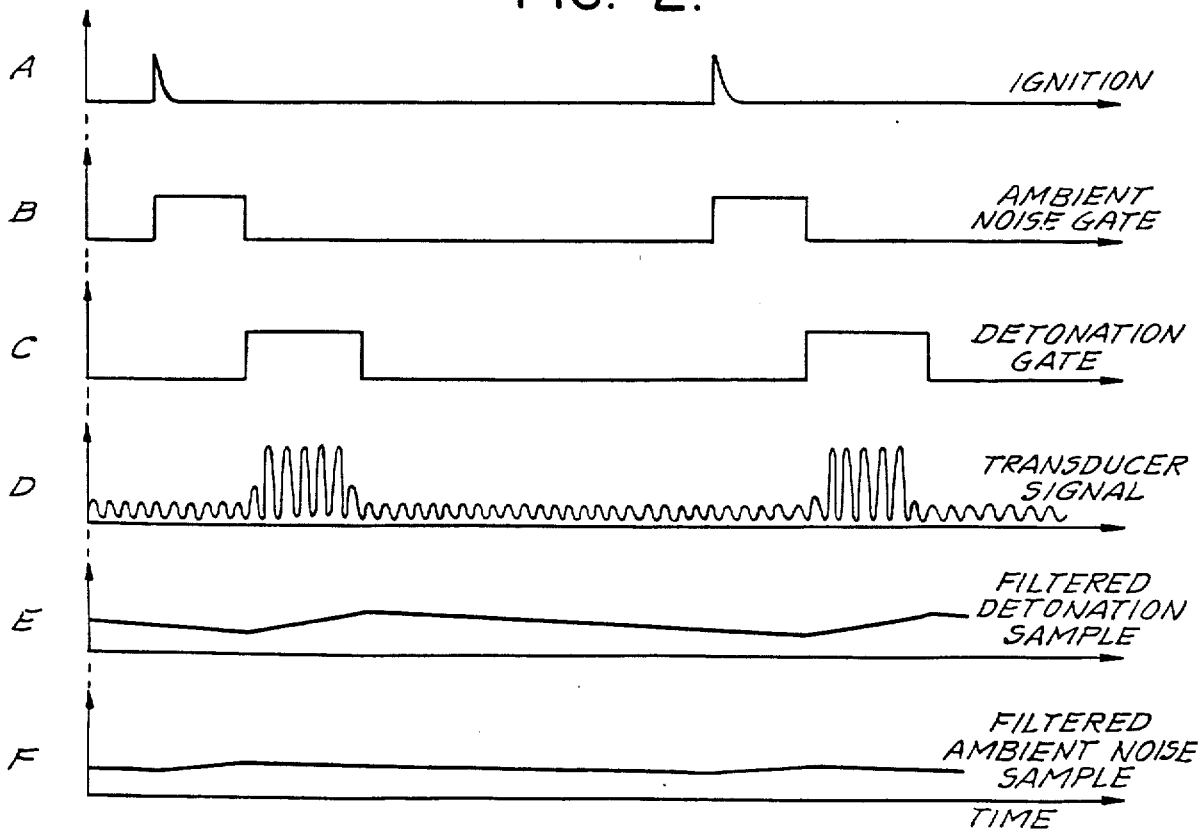
FIG. 2 is a succession of electrical waveforms occurring in the circuit of FIG. 1, and presented to the same time scale[.]*; and*

The audio transducer 10 converts audio noise and signals generated by explosions in the combustion chamber into an electrical signal which is illustrated as signal D in FIG. 2. The audio transducer is preferably tuned to the mechanically resonant frequency of the cylinder to enhance the efficiency of the transducer. A suitable audio transducer for use with the instant invention is commercially available from Telex Corporation (formerly Turner Microphone), of Minneapolis, Minn.

In operation, the cylinder-ignition signal A (FIG. 2) for the detonation-prone cylinder triggers ambient-gate timer 50. Ambient-gate timer 50, which can be, for example, a monostable multivibrator or equivalent circuit, generates waveform B of FIG. 2. Waveform B is applied to the detonation-gate timer 30 and also the ambient-signal gate and filter 40. Application of waveform B to ambient-signal gate and filter 40 enables this circuit for the duration of each waveform-B pulse (approximately 1.5 milliseconds), and in response thereto, circuit 40 samples and filters waveform D for waveform-B pulse intervals, thereby generating "ambient" waveform F of FIG. 2. Circuit 40 consists of a voltage-controlled switch and an operational amplifier (not shown). As the circuitry required to sample and filter waveform D, and to generate waveform F, is well known, it will not be described in further detail. Waveform F is applied to the "−" terminal of differential amplifier 60.

The trailing edge of waveform B also triggers the detonation gate timer 30, which can consist of, for example, a monostable multivibrator. Gate timer 30 generates signal C (FIG. 2), which enables the detonation-signal gate and filter 20 for a period of approximately 2.2 milliseconds. Detonation-signal gate and filter 20, which is a circuit identical to circuit 40, samples and filters waveform D to produce "detonation" waveform E (FIG. 2), and waveform E is applied to the "+" terminal of differential amplifier 60.

The differential amplifier *60* compares and filters signals E and F, and the output of the comparison from the differential amplifier is applied to *detonation-control circuitry. In FIG. 1, this is shown by legend to comprise a* detonation-threshold detector 70 *and a line 71 connected directly to fuel enrichment control means for the engine (not shown)*. Threshold detector 70 consists of a voltage-level detection circuit which monitors the varying DC output voltage of the differential amplifier. When this level exceeds a preset voltage value, an output signal is generated which is [applied to detonation-control circuitry. In FIG. 1, this is shown by legend to comprise a] *supplied in line 72 for proportional control of spark-retardation in ignition timing of the involved engine, and switch 73 in line 72 will be understood to indicate the optional or selective use of retardation control, depending upon performance of the engine. The* fuel-enriching signal in line 71 [to the throttle-control means (not shown) of the engine;] *provides* generally, [the] *a* maximum enrichment [is] in the order of 10 percent of current fuel flow to the entire engine, and preferably (as also suggested by legend) the degree of enrichment is proportional to the extent of detonation-signal [excess over threshold. FIG. 1 also shows that the same output signal from detector 70 may be supplied in line 72 for proportional control of spark-retardation in ignition timing of the involved engine, and switch 73 in line 72 will be understood to indicate the optional or selective use of retardation control, depending upon performance of the engine]. The added fuel of the enrichment slows down the rate of combustion in the combustion chamber and also serves to cool the walls of the combustion chamber. Fuel enrichment can be in the range up to 20 percent; and if selected, spark timing can be retarded by approximately 8 degrees at the time the fuel supply is enriched. These figures are to be considered illustrative for a six-cylinder, two-cycle engine of the type shown in my said patent.

What has been shown and described is a gated knock-detection circuit for detecting the presence of engine knock and for thereafter initiating preventive measures to reduce or eliminate the knock, thereby preventing the possibility of attendant engine damage. Knock-detection and prevention are accomplished by monitoring the audio frequencies generated by a detonation occurrence, to produce an electrical detonation signal. This signal is filtered and two samples are taken from sequential segments of the electrical detonation signal. The two samples are compared and, when the samples taken from the later-occurring segment exceed the voltage amplitude of the sample taken from the earlier occurring segment, it is determined that engine knock is commencing. When engine knock commences, fuel is added to the combustion chamber to slow down the rate of combustion and cool the walls of the combustion chamber, thereby reducing, or eliminating, engine knock and the possibility of attendant engine damage. Since proportional control and continuous samplings are taken and compared, the circuitry automatically assures enrichment and (if selected) retardation, to the minimum degree tolerated by the threshold at 70.

Generally speaking, the threshold at 70 should correspond to a "detonation" signal E which is at least 10 percent greater than the currently observed "ambient" signal F. The indicated 1.5 and 2.2 milliseconds times for the gate-signal intervals B, C are stated as preferred, in that ±2 percent variation is deemed to state a preferred tolerance range of these timed intervals. Lesser sampling intervals may produce equivalent results, as long as the ambient-signal sampling includes no part of the detonation-signal sampling; these samplings need not therefore be contiguous with each other, nor need the ambient sampling be contiguous with the ignition signal, but circuitry is much simpler for the case of contiguous intervals, as shown and described.

As a further and fail/safe feature of the invention, FIG. 1 also shows a differential amplifier 80, labeled "Loss-of-Sensor Detector" for monitoring whether or not there is sufficient output from audio transducer 10. At amplifier 80, the audio output level (at the "−" input) must equal or exceed the reference threshold voltage level (at the "+" input) to avoid generating a strong fail/safe signal in line 81 to the detonation detector 70. In other words, when detector 80 senses that transducer (10) output is inadequate, line 72 calls for maximum retardation, thus assuring engine safety.

Figure 3:
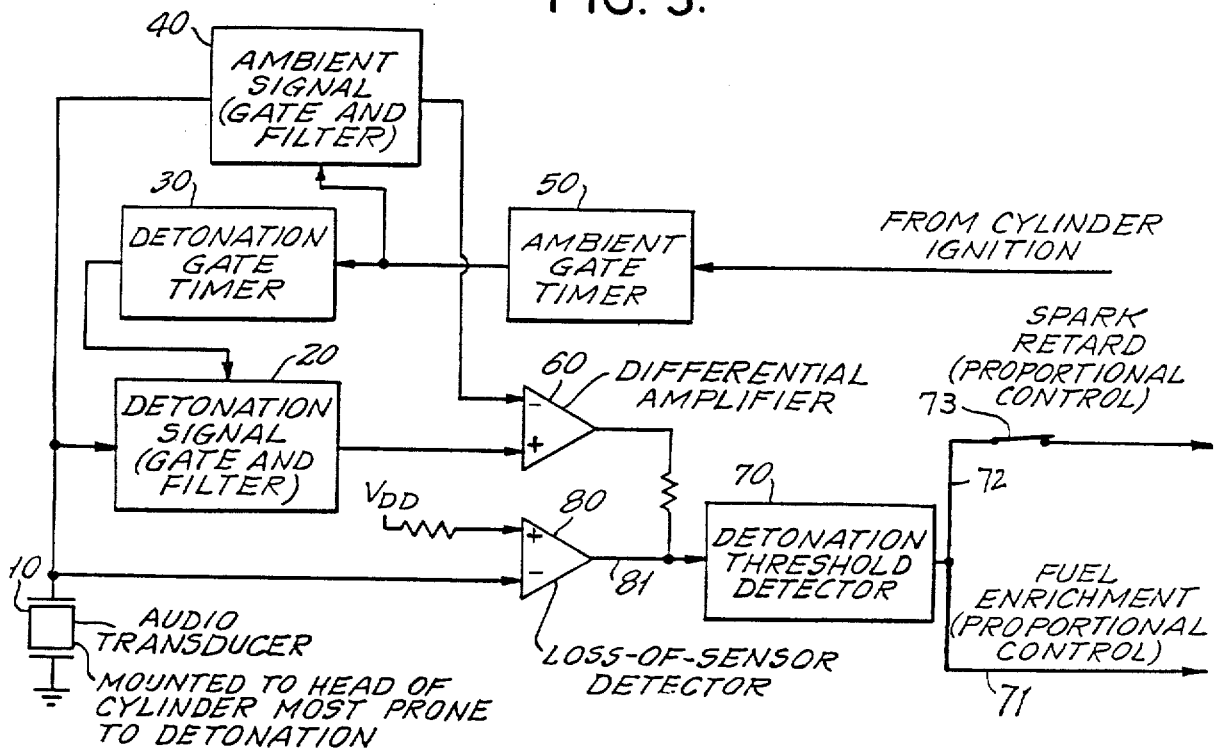
*FIG. 3 is an electrical block diagram schematically depicting another embodiment of the instant invention.*

*While the embodiment illustrated in FIG. 1 is presently preferred, it may be desirable to subject the fuel enrichment signal on line 71 to control of the threshold detector 70 as shown in FIG. 3, wherein the same reference numerals are used as in FIG. 1 to designate the same or similar parts.*

Although [a] specific [embodiment] *embodiments* of the invention [has] *have* been shown and described, it will be understood that various modifications may be made without departing from the spirit of this invention. For example, the invention will be seen to be applicable to four-cycle engines, whether fuel is supplied by injection or by carburetion; and digital techniques utilizing a microprocessor may be used in place of the described gating, filtering and comparison of analog data.

What is claimed is:

1. A knock detection and prevention circuit for an internal-combustion engine, comprising:

transducer means for converting audio signals indicative of engine combustion and occurring within a [combination] *combustion* chamber of the engine into an electrical signal which is characterized, for each engine cycle, by one phase during which any detonation is likely to occur and by another phase during which detonation is unlikely to occur, means for sequentially sampling and filtering from said respective phases separate segments of said electrical signal whereby separate filtered-sample signals are produced from the sampling of said respective phases, means for comparing the amplitude of the filtered-sample signal from a sequentially first segment of said electrical signal, with amplitude of the filtered-sample signal from a sequentially second segment of said electrical signal, and threshold means responsive to a predetermined difference in the amplitude of said first and second filtered-sample signals for increasing the rate of fuel supply to the combustion chamber of the internal combustion engine.

2. A knock-detection and prevention circuit according to claim 1, in which comparator means is connected to said transducer means for comparing transducer-output voltage against a predetermined reference voltage, said predetermined reference voltage being selected for correspondence with the predetermined amplitude difference beyond which said threshold means is responsive, said comparator means providing an amplified output signal to said threshold means and with an amplitude exceeding the predetermined difference to which said threshold means is responsive, whereby knock-prevention measures are automatically initiated as a fail/-safe procedure in the event of transducer output voltage which fails to exceed said reference voltage.

3. A knock-detection and prevention circuit according to claim 1, in which the internal combustion chamber is of multi-cylinder variety and said transducer means is mounted to the cylinder head of the engine cylinder most prone to detonation knocking.

4. A knock-detection and prevention circuit according to claim 3, in which said threshold means is responsive to said predetermined difference to increase the rate of fuel supply to all cylinders of the engine.

5. A knock-detection and prevention circuit according to claim 4, in which said threshold means is also responsive to said predetermined difference to retard the spark timing of the engine.

6. A knock-detection and prevention circuit according to claim 1, wherein said sequential filtering and sampling means includes first timing means responsive to an ignition pulse applied to the combustion chamber for initiating a first sampling period.

7. A knock-detection and prevention circuit according to claim 6, in which the timing of said first timing means is approximately 1.5 milliseconds.

8. A knock-detection and prevention circuit according to claim 7, in which said 1.5 milliseconds timing is ± about 2 percent.

9. A knock-detection and prevention circuit in accordance with claim 6, wherein said sequential filtering and sampling means further includes a first filtering and sampling circuit responsive to said first timing means for extracting a first filtered sample from said electrical detonation signal during said first sampling period.

10. A knock-detection and prevention circuit in accordance with claim 9, wherein said sequential filtering and sampling means further includes a second timing means responsive to the termination of said first sampling period for initiating a second sampling period.

11. A knock-detection and prevention circuit according to claim 10, in which the timing of said first timing means is approximately 1.5 milliseconds and in which the timing of said second timing means is approximately 2.2 milliseconds.

12. A knock-detection and prevention circuit according to claim 11, in which said 2.2 millisecond timing is ± about 2 percent.

13. A knock-detection prevention circuit in accordance with claim 10, wherein said sequential filtering and sampling means further includes a second filtering and sampling circuit responsive to said second timing means for extracting a second filtered sample from said electrical detonation signal during said second sampling period, said second sampling period occurring later in time than said first sampling period.

14. A knock-detection and prevention circuit according to claim 13, wherein said fuel-supply increasing means increases the fuel supply to the combustion chamber when the voltage amplitude of the second filtered-sample signal exceeds the voltage amplitude of the first filtered-sample signal by a predetermined amount.

15. A knock-detection and prevention circuit according to claim 14, in which the degree to which said fuel-supply increasing means increases the fuel supply is proportional to the degree to which the voltage amplitude of the second filtered-sample signal exceeds that of the first filtered-sample signal.

*16. A knock detection and prevention circuit for an internal-combustion engine, comprising:*

*transducer means for converting audio signals indicative of engine combustion and occurring within a combustion chamber of the engine into an electrical signal which is characterized, for each engine cycle, by one phase during which any detonation is likely to occur and by another phase during which detonation is unlikely to occur,*

*means for sequentially sampling and filtering from said respective phases separate segments of said electrical signal whereby separate filtered-sample signals are produced from the sampling of said respective phases,*

*means for comparing the amplitude of the filtered-sample signal from a sequentially first segment of said electrical signal, with amplitude of the filtered-sample signal from a sequentially second segment of said electrical signal, and*

*means responsive to a difference in the amplitude of said first and second filtered-sample signals for increasing the rate of fuel supply to the combustion chamber of the internal combustion engine.*

*17. A knock-detection and prevention circuit according to claim 16, in which said means responsive to amplitude-difference comprises threshold means responsive to a predetermined difference in said amplitudes for retarding the spark timing of the engine.*

* * * * *